J. C. CHAPMAN.
Hatchet.
No. 199,959. Patented Feb. 5, 1878.
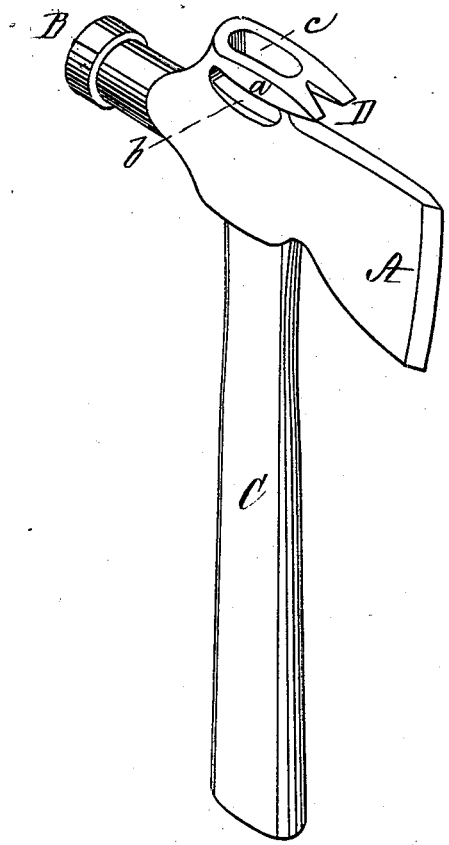
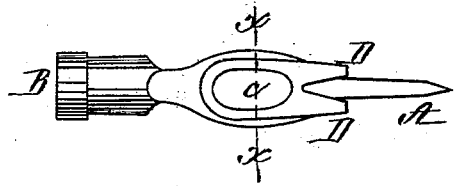
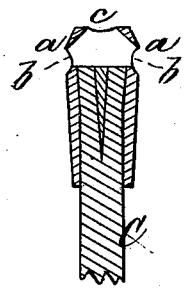
Witnesses,
W. J. Cambridge
J. E. Cambridge
Inventor,
John C. Chapman
Per Teschemacher & Stearns,
Attorneys.

UNITED STATES PATENT OFFICE.

JOHN C. CHAPMAN, OF BOSTON, MASSACHUSETTS.

IMPROVEMENT IN HATCHETS.

Specification forming part of Letters Patent No. 199,959, dated February 5, 1878; application filed October 12, 1877.

*To all whom it may concern:*

Be it known that I, JOHN C. CHAPMAN, of Boston, in the county of Suffolk and State of Massachusetts, have invented an Improved Implement for Opening and Packing Boxes, and for other purposes, of which the following is a full, clear, and exact description, reference being had to the accompanying drawings, making part of this specification, in which—

Figure 1 is a perspective view of my improved implement. Fig. 2 is a plan of the top of the same. Fig. 3 is a section on the line $x$ $x$ of Fig. 2.

My present invention consists in combining with a hammer-head and hatchet-blade one or more shaves located in line with the handle, and a claw projecting out from the shave or shaves in the direction of the hatchet-blade or hammer-head, whereby a compact and convenient tool is produced, which is designed for box-packers, carpenters, and for general use.

To enable others skilled in the art to understand and use my invention, I will proceed to describe the manner in which I have carried it out.

In the said drawings, A represents a hatchet-blade, and B a hammer-head, arranged on opposite sides of the socket or eye, into which is fitted the handle C. Formed in one and the same piece with the hatchet and hammer, and located in line with the handle, are two shaves, $a\ a$, situated opposite each other on an extension of the two remaining sides of the socket or eye, slots $b$, which serve as throats, being provided to allow of the passage of the shavings, which escape through the elongated aperture $c$ at the top of the implement when it is applied flatwise with its central portion resting on a box-cover or other surface having names or figures to be removed therefrom, the eye or socket portion thus serving as a guide for the shave, so that by varying the angle at which the handle is held the thickness of the shaving may be graduated, as desired. Projecting from the shaves in the direction of the hatchet-blade A is a claw, D, for drawing nails, a space of sufficient width being left between the rear end of the hatchet-blade and the claw to allow of the claw being entered under a box-cover, in which case it serves the office of a chisel for prying up and removing the same.

It is evident that the claw D, instead of projecting out in the direction of the hatchet-blade, as shown, may extend out in the direction of the hammer-head, if desired.

What I claim as my invention, and desire to secure by Letters Patent, is—

The within-described implement, consisting of a hatchet-blade, A, hammer-head B, and one or more shaves, $a$, located in line with the handle C, and a claw, D, projecting out from the shave or shaves in the direction of the hammer-head or hatchet-blade, all constructed in one piece, and arranged as shown and set forth.

Witness my hand this 9th day of October, 1877.

JOHN C. CHAPMAN.

In presence of—
 N. W. STEARNS,
 P. E. TESCHEMACHER.